(12) United States Patent
Chan

(10) Patent No.: US 8,762,491 B2
(45) Date of Patent: *Jun. 24, 2014

(54) OPTIMIZATION OF GAMING APPLICATION EXECUTION USING PROXY CONNECTION

(71) Applicant: Nextbit Systems Inc., San Francisco, CA (US)

(72) Inventor: Michael A. Chan, San Francisco, CA (US)

(73) Assignee: Nextbit Systems Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/167,952

(22) Filed: Jan. 29, 2014

(65) Prior Publication Data

US 2014/0148255 A1 May 29, 2014

Related U.S. Application Data

(63) Continuation-in-part of application No. 14/043,438, filed on Oct. 1, 2013.

(60) Provisional application No. 61/708,794, filed on Oct. 2, 2012.

(51) Int. Cl.
G06F 15/16 (2006.01)
A63F 13/12 (2006.01)

(52) U.S. Cl.
CPC ...................................... *A63F 13/12* (2013.01)
USPC ......................................... 709/217; 709/235

(58) Field of Classification Search
CPC ............ G06F 17/3015; G06F 17/3007; G06F 17/30091; H04I 67/2823; H04I 67/40; H04I 67/42; H04I 67/2842; H04I 67/1095; H04I 67/10; H04I 9/3226; H04I 9/0825
USPC .................................................. 709/217, 235
See application file for complete search history.

(56) References Cited

U.S. PATENT DOCUMENTS

| | | | |
|---|---|---|---|
| 2012/0131184 A1* | 5/2012 | Luna et al. ..................... | 709/224 |
| 2013/0073389 A1* | 3/2013 | Heath ......................... | 705/14.54 |
| 2013/0110637 A1* | 5/2013 | Bott ........................... | 705/14.64 |
| 2013/0238686 A1* | 9/2013 | O'Donoghue et al. ....... | 709/203 |

OTHER PUBLICATIONS

Co-Pending U.S. Appl. No. 14/197,121 by Chan, M.A. et al., filed Mar. 4, 2013.
Co-Pending U.S. Appl. No. 14/043,438 by Chan, M.A., filed Oct. 1, 2013.
Co-Pending U.S. Appl. No. 14/042,507 by Chan, M.A. et al., filed Sep. 30, 2013.

* cited by examiner

*Primary Examiner* — David X Yi
(74) *Attorney, Agent, or Firm* — Perkins Coie, LLP

(57) ABSTRACT

Technology is disclosed herein for executing multiple gaming applications on a computing device. According to at least one embodiment, a computing device receives requests for network connections with remote servers from multiple gaming applications running on the computing device. The computing device further establishes a network connection with a proxy server. The proxy server initiates and maintains proxy network connections with the remote servers. The proxy server batches network messages received from the remote servers, where the network messages includes gaming content. The proxy server aggregates network messages received in a time period into a single batch, where a time length of the time period is determined based on one or more game events of the games being played on the computing device. Further, the proxy server batches network messages such that the computing device stays at a high power consumption state for a shorter time period than an overall time period required without batching.

25 Claims, 8 Drawing Sheets

OPTIMIZATION OF GAMING APPLICATION EXECUTION USING PROXY CONNECTION

PRIORITY CLAIM

This application is a continuation-in-part of U.S. patent application Ser. No. 14/043,438, entitled "DEVICE CONNECTION PROXY THROUGH CLOUD TO OPTIMIZE NETWORK MESSAGES", filed on Oct. 1, 2013, which claims the benefit of U.S. Provisional Patent Application No. 61/708,794, entitled "CLOUD COMPUTING INTEGRATED OPERATING SYSTEM", filed on Oct. 2, 2012, which are incorporated by reference herein in their entirety.

FIELD OF THE INVENTION

At least one embodiment of the present invention pertains to mobile devices, and more particularly, to mobile devices using a cloud-based connection proxy server to optimize network messages.

BACKGROUND

There are many applications running on computing devices, e.g., mobile phones, tablet computers, laptop computers, etc., that can receive push notifications and messages from remote servers. Instead of a pull messaging transaction that is initiated by a receiving application, a remote server (e.g. an information publisher) initiates a push messaging transaction. Through a setting interface provided by an application or an operating system of a computing device, a user can adjust the preference and the subscriptions regarding the push and pull messaging transactions.

For instance, the Apple Push Notification Service is a push service. The Apple Push Notification Service forwards notifications from remote servers of applications to the Apple devices through a constantly open Internet Protocol (IP) connection. Such notifications can include badges, sounds or test alerts. Developers of applications can take advantage of the push service by using application programming interface (API) calls provided by Apple, Inc. The size of each notification message is usually restricted to a predetermined size, e.g. 256 bytes. Cloud-to-Device Messaging (C2DM) is a push service that allows remote servers to send messages to mobile applications on computing devices. Remote servers can use this service to notify mobile applications to contact the server and fetch updated data.

These message push services can create serious drains on the batteries of the computing devices, particularly for computing devices maintaining wireless network connections (e.g. WiFi or cellular networks). Every time a new message notification is pushed to a computing device, the computing device switches from a low power conservation state to a higher power consuming state for a period of time. Once entering the higher power consuming state, the computing device has to remain in the state for at least a fixed time period before the device can return to a low power conservation state. When push notifications reach the computing device at different points in time, the computing device needs to enter the higher power consuming state numerous times (and overall for a long period of time) to receive and process the push notifications, resulting in draining the battery of the computing device.

SUMMARY

Technology introduced here provides a mechanism to optimize executing multiple gaming applications on a computing device which require network connections using cloud proxy connections. According to at least one embodiment, a computing device receives requests for network connections with remote servers from multiple gaming applications running on the computing device. The computing device further establishes a cloud network connection with a cloud proxy server. The cloud proxy server initiates and maintains proxy network connections with the remote servers.

The cloud proxy server batches network messages received from the remote servers, where the network messages includes gaming content. The cloud proxy server aggregates the network messages received from the remote servers such that the cloud proxy server sends the network messages to the computing device continuously in a batch, helping enable the computing device to conserve battery power. Further, the cloud proxy server aggregates the network messages received in a time period into a single batch, where a time length of the time period is determined based on one or more game events of the games being played on the computing device.

In accordance with the techniques introduced here, therefore, a proxy server for optimizing network connections is provided. The proxy server includes a processor, a network component, a device connection module, a server connection module, and a message aggregation module. The networking component is configured for network communications with computing devices and remote servers. The device connection module includes instructions which, when executed by the processor, establish a device network connection with a computing device. The server connection module includes instructions which, when executed by the processor, establish a server network connection with a remote server in response to a request of connecting the remote server from the computing device. The message aggregation module includes instructions which, when executed by the processor, aggregates network messages for the computing device received from multiple remote servers in a batch before sending the batch to the computing device.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, however.

Figure 1:
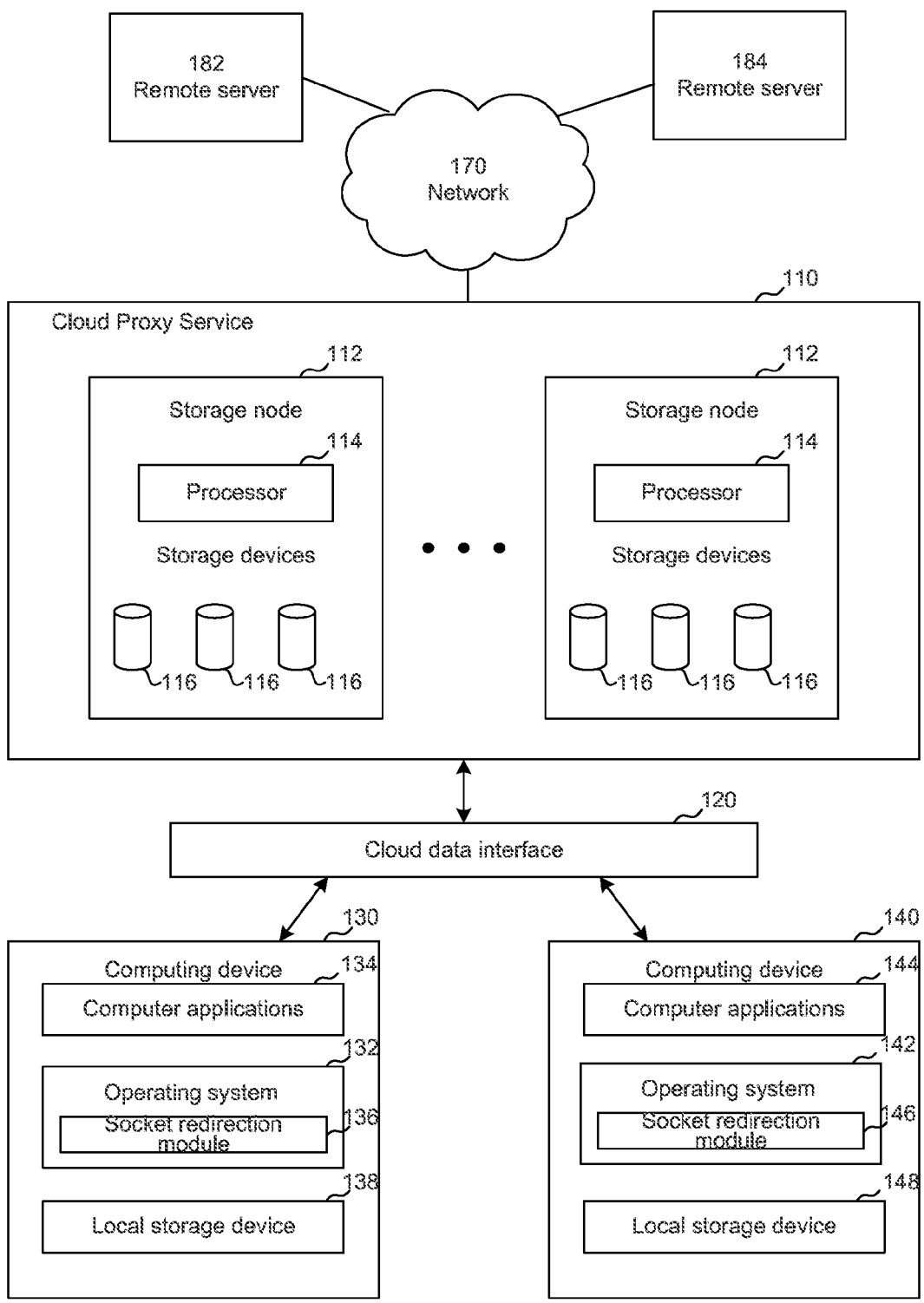
FIG. 1 illustrates an example system for computing devices connected to a cloud proxy service.

FIG. 1 illustrates an example system for computing devices connected to a cloud proxy service. The system includes a cloud proxy service 110 configured to handle communications between the computing devices and remote servers. In one embodiment, the cloud proxy service 110 can be a server cluster having computer nodes interconnected with each other by a network. The server cluster can communicate with remote servers via the Internet. The cloud proxy service 110 contains storage nodes 112. Each of the storage nodes 112 contains one or more processors 114 and storage devices 116. The storage devices can include optical disk storage, RAM, ROM, EEPROM, flash memory, phase change memory, magnetic cassettes, magnetic tapes, magnetic disk storage or any other computer storage medium which can be used to store the desired information.

A cloud data interface 120 can also be included to receive data from and send data to computing devices. The cloud data interface 120 can include network communication hardware and network connection logic to receive the information from computing devices. The network can be a local area network (LAN), wide area network (WAN) or the Internet. The cloud data interface 120 may include a queuing mechanism to organize data update received from or sent to the computing devices 130 and 140.

The computing devices 130 and 140 can each communicate with remote servers via the cloud proxy service 110. When an application running on computing device 130 or 140 sends a message to a remote server, the device 130 or 140 sends the message to the cloud proxy service 110 instead. The cloud proxy service 110 maintains the network connection with the remote server and relays the message to the remote server. When the remote server sends a message to the application, the message reaches the cloud proxy service 110 via the established network connection. The cloud proxy service 110 determines the appropriate computing device to receive the message and relays the message to the computing device.

Although FIG. 1 illustrates two computing devices 130 and 140, a person having ordinary skill in the art will readily understand that the technology disclosed herein can be applied to a single computing device or more than two computing devices connected to the cloud proxy service 110.

A computing device 130 includes an operating system 132 to manage the hardware resources of the computing device 130 and provides services for running computer applications 134 (e.g., mobile applications running on mobile devices). The computer applications 134 stored in the computing device 130 require the operating system 132 to properly run on the device 130. The computing device 130 includes at least one local storage device 138 to store the computer applications and user data. The computing device 130 or 140 can be a desktop computer, a laptop computer, a tablet computer, an automobile computer, a game console, a smart phone, a personal digital assistant, or other computing devices capable of running computer applications, as contemplated by a person having ordinary skill in the art.

The computer applications 134 stored in the computing device 130 can include applications for general productivity and information retrieval, including email, calendar, contacts, and stock market and weather information. The computer applications 134 can also include applications in other categories, such as mobile games, factory automation, GPS and location-based services, banking, order-tracking, ticket purchases or any other categories as contemplated by a person having ordinary skill in the art.

The operating system 132 of the computing device 130 includes a socket redirection module 136 to redirect network messages. The computer applications 134 generate and maintain network connections directed to various remote servers, e.g. remote servers 182 and 184. Instead of directly opening and maintaining the network connections with these remote servers, the socket redirection module 136 routes all of the network messages for these connections of the computer applications 134 to the cloud proxy service 110. The cloud proxy service is responsible for opening and maintaining network connections with the remote servers 182 and 184.

All or some of the network connections of the computing device 130 are proxied through the cloud proxy service 110. The network connections can include Transmission Control Protocol (TCP) connections, User Datagram Protocol (UDP) connections, or other types of network connections based on other protocols. When there are multiple computer applications 134 that need network connections to multiple remote servers, the computing device 130 only needs to maintain one network connections with the cloud proxy service 110. The cloud proxy service 110 will in turn maintain multiple connections with the remote servers on behalf of the computer applications 134.

The cloud proxy service can connect to the remote servers 182 and 184 via a network 170. The network 170 can be, for example, the Internet, a metropolitan area network (MAN), a wide area network (WAN), a LAN, or any other type of network or combination of networks.

The cloud proxy server 110 receives networking messages (e.g. push or pull notifications) from the remote servers. Instead of sending the messages to the applications running on the computing device, the cloud proxy server 110 can batch the incoming networking messages and optimize the wireless power consumption of the computing device by delaying networking messages and sending them to the computing devices in batches. This can lead to more efficient power usage of the computing device.

The computer applications 134 running on the same computing device 130 need not communicate with each other to coordinate their network connections with remote servers. The cloud proxy 110 efficiently maintains the network connections with remote servers for the applications 134 and controls the timing of sending messages back to the applications 134.

Figure 2:
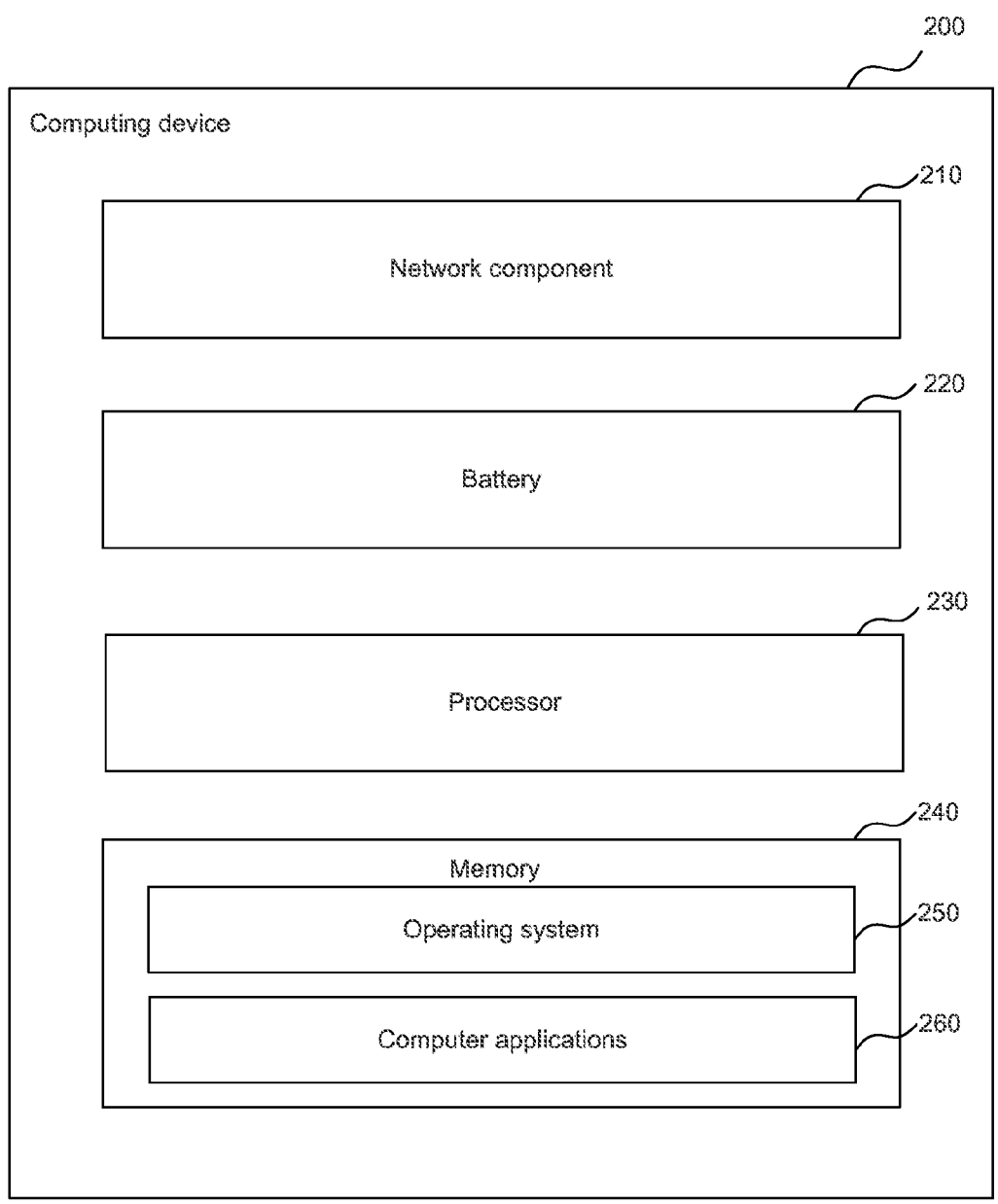
FIG. 2 illustrates an example of a computing device that can communicate with a cloud proxy server.

FIG. 2 illustrates an example of a computing device that can communicate with a cloud proxy server, according to one embodiment. The computing device 200 can include a networking component 210, a battery 220, a processor 230 and a memory 240. The memory 240 can store instructions of an operating system 250 of the computing device 200. The memory 240 can further store instructions of one or more computer applications 260 designed to run on the computing device 200.

The networking component 210 can be capable of switching between states including a high power consumption state and a low power conservation state. The network component 210 can be, e.g. a WiFi networking adapter, a cellular phone networking adapter, or a combination thereof. The battery 220 is configured to provide power to the networking component and other components of the computing device 200. The computing device may further include a power adapter to be connected to a power source to provide power for the computing device 200, in addition to the power provided the battery 220.

The processor 230 is configured to run computer applications 260 and the operating system 250 of the computing device 200. The memory 240 stores instructions of the operating system 250 which, when executed by the processor 230, cause the operating system 250 to perform processes for realizing certain functionalities of the computing device 200.

For instance, the process of the operating system 250 can receive, from the computer applications 260, requests for network connections with remote servers (e.g., remote servers 182 and 184 in FIG. 1). The process of the operating system 250 can further establish a cloud network connection (via, e.g., the network component 210) with a cloud proxy server (e.g., cloud proxy service 110 in FIG. 1). The computer applications 260 do not need to be aware of the cloud proxy server. The computer applications 260 can perform and communicate with the remote servers as if the computer application were directly connected to the remote servers. The operating system 250 running behind the computer applications 260 is responsible to relay network messages to and from the cloud proxy server.

The cloud proxy server can be configured to maintain proxy network connections with the remote servers. The process of the operating system 250 can further receive, from the cloud proxy server (via, e.g., the network component 210), network messages in a batch for the computer applications 260 though the cloud network connection. The network messages are generated by the remote servers and can include, e.g., push notifications. The cloud proxy server delays at least one network message of the network messages in order to aggregate the network messages in the batch.

In various embodiments, the network messages can include other types of data. For instance, the computer applications can include one or more instances of network browsers. The network browsers generate requests (e.g. HTTP GET) for Internet data from remote Hypertext Transfer Protocol (HTTP) servers. Instead of establishing TCP connections directly with the remote HTTP servers, the computing device lets the cloud proxy server work as a proxy and establish TCP connections with the HTTP servers. The computing device receives network messages including the HTTP data from the cloud proxy server. The HTTP GET requests from different instances of browsers will be satisfied by batched HTTP data replayed and aggregated by the cloud proxy server. In this way, the battery power and the network connections of computing device are optimized and utilized in a more efficient way.

The network component 210 switches to the high power consumption state when the computing device 200 receives the network messages from the cloud proxy server. The network messages can be aggregated in the batch such that the network component 210 of the computing device 200 remains at the high power consumption state to receive the network messages for as little time as possible. In this way, the computing device 200 can consume as little power as possible for receiving the network messages. As a result, the battery life of the computing device 200 is extended.

Figure 3:
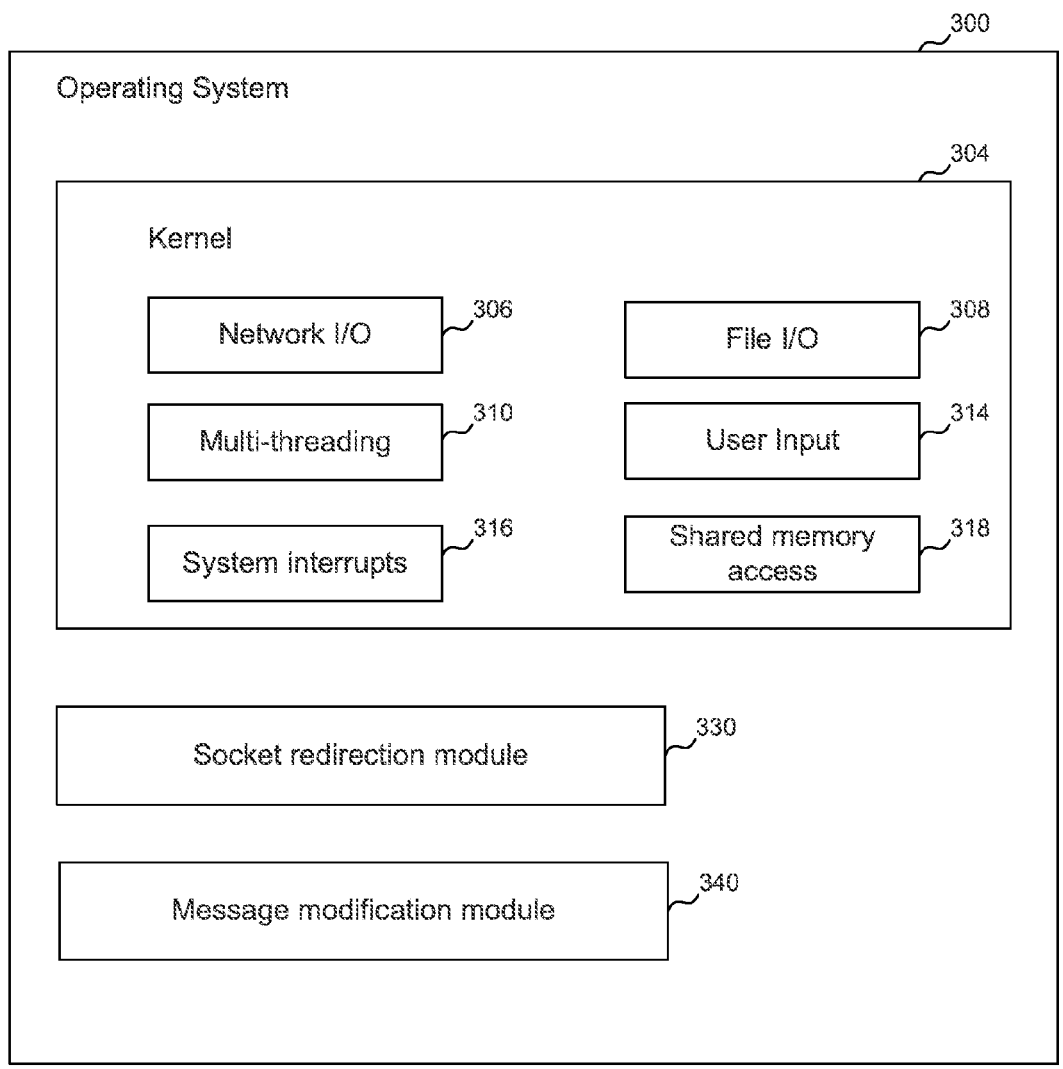
FIG. 3 illustrates an example operating system of a computing device for redirecting network communications.

FIG. 3 illustrates an example operating system of a computing device for redirecting network communications, according to one embodiment. The operating system 300 includes a kernel 304. The kernel 304 provides interfaces to hardware of the electronic device for the computer applications running on top of the kernel 304, and supervises and controls the computer applications. The kernel 304 isolates the computer applications from the hardware. The kernel 304 may include one or more intervening sources that can affect execution of a computer application. In one embodiment, the kernel 304 includes a network I/O module 306, a file I/O module 308, multi-threading module 310, user input 314, system interrupts 316, and shared memory access 318.

A socket redirection module 330 runs on top of the kernel 304. The socket redirection module 330 is responsible for directing the network communications (also referred to as socket communications) of the computer applications to the cloud proxy server. The socket redirection module 330 is configured to redirect the requests from the computer applications for network connections with the remote server to the cloud proxy server. So instead of connecting directly with the remote servers as requested by the computer applications, the computing device connects with the cloud proxy server using the socket redirection module 330. The socket redirection module 330 is responsible for network communications with the cloud proxy server; while the computer applications running on the computing device are not necessarily aware of the existence of the cloud proxy server.

In some embodiments, the operating system 300 can further include a message modification module 340 configured to modify the network messages received from the cloud proxy server before the network messages are fed to the computer applications. The message modification module 340 modifies the received network messages to network messages as if they were directly sent from the remote servers. For instance, the message modification module 340 may change source socket addresses of the received network messages from a socket address of the cloud proxy server to socket addresses of the remote servers. Then the modified network messages are fed to the corresponding computer applications (e.g., depending on port numbers). Since the computer applications receive the modified network messages with target socket addresses pointing to the remote servers, the computer applications can process and treat these modified network messages as if they are directly sent from the remote servers, without any intermediate proxies.

In some alternative embodiments, the operating system 300 may provide a socket handle controlled by the socket redirection module 330. The socket handle may be a modified version of a normal handle. When applications running on top of the operating system 300 call the socket handle, the socket redirection module 330 is controlling the socket handle to redirect network connection transactions to the cloud proxy server. The computer application or the developer of the computer application does not need to be aware of the socket redirection module 330. When the computer application calls the socket handle to open a connection with the remote servers, the socket redirection module 330 of the operating system 300 takes over and instead redirects the network connection to the cloud proxy server.

The developers of the computer applications do not need to design the computer application with two network modes (e.g. WiFi mode and cellular data mode) in mind. The computing device is connected to the cloud proxy server. The cloud proxy server is handling the network communication between the computing device and the outside remote servers. The computer applications can be designed to perform as if the computing device is connected to a WiFi network all the time. The operating system of the computing device and the cloud proxy server is handling and optimizing the network communications without the intervention of the computer applications.

Figure 4:
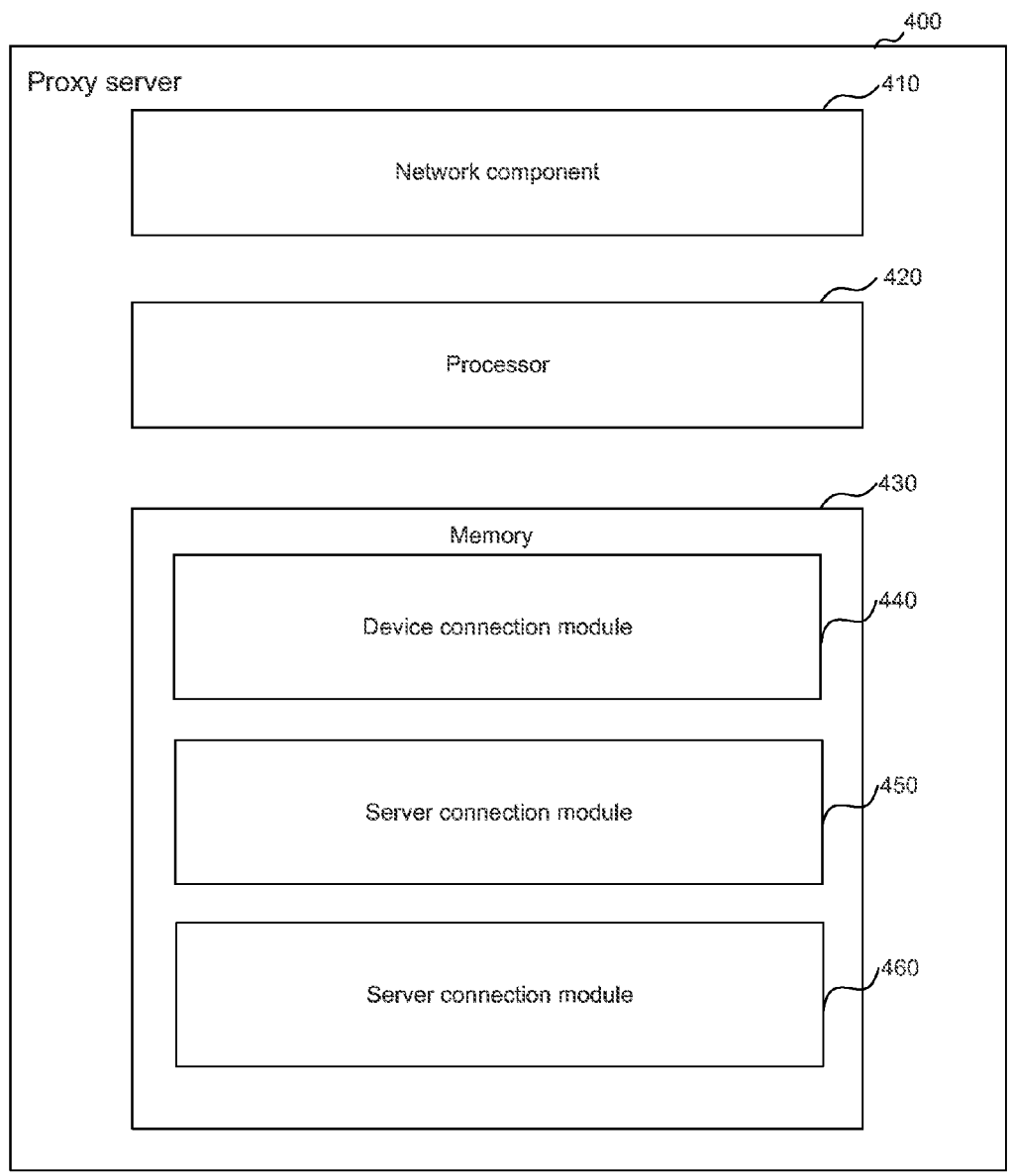
FIG. 4 illustrates an example of a proxy server can batch network communications.

FIG. 4 illustrates an example of a proxy server that can batch network communications, according to one embodiment. The proxy server 400 can be, e.g., a dedicated standalone server, or implemented in a cloud computing service. The proxy server includes a network component 410, a processor 420, and a memory component 430. The memory 430 can include instructions for a device connection module 440, a server connection module 450, and a message aggregation module 460. The networking component is 410 configured for network communications with computing devices and remote servers, as shown in, e.g., FIG. 1. In some embodiments, the proxy server can include multiple network components for network communications with different computing devices and remote servers.

The device connection module 440 includes instructions which, when executed by the processor 420, establishes a device network connection with a computing device. The server connection module 450 includes instructions which, when executed by the processor 420, establishes a server network connection with a remote server in response to a request to connect the remote server from the computing device. The request can be generated by a computer application running at the computing device. The server connection module 450 can maintain multiple server network connections with multiple remote servers as a proxy of one or more computer applications of the computing devices.

The message aggregation module 460 includes instructions which, when executed by the processor 420, aggregates network messages for the computing device received from multiple remote servers in a batch before sending the batch to the computing device. During the aggregating process, the message aggregation module 460 can identify network messages for one computing device among received network messages for different computing devices connected to the proxy server 400. The message aggregation module 460 can further delay at least one of the network messages for the computing device such that the network messages for the computing device can be sent in a batch.

The message aggregation module 460 can aggregate network message received in a time period into a single batch. The time length of the time period can be determined by factors including a battery life of the computing device, a current battery level of the computing device, a usage pattern of the computing device, a workload of the computing device, or a frequency of receiving network messages for the computing device. For instance, the time length for batching can be increased when the current battery level of the computing device is low or the current workload of the computing device is high. The time length for batching can be decreased if the frequency of receiving network messages for the computing device is higher than certain value. If the computing device is not used frequently according to the usage pattern, the time length for batching may be increased.

The message aggregation module 460 can also aggregate network messages generated by the computer applications for the remote servers. The message aggregation module 460 can receive the message from the computing device and delay some of the messages so that the messages can be sent out to the remote servers in one or more batches.

Figure 5:
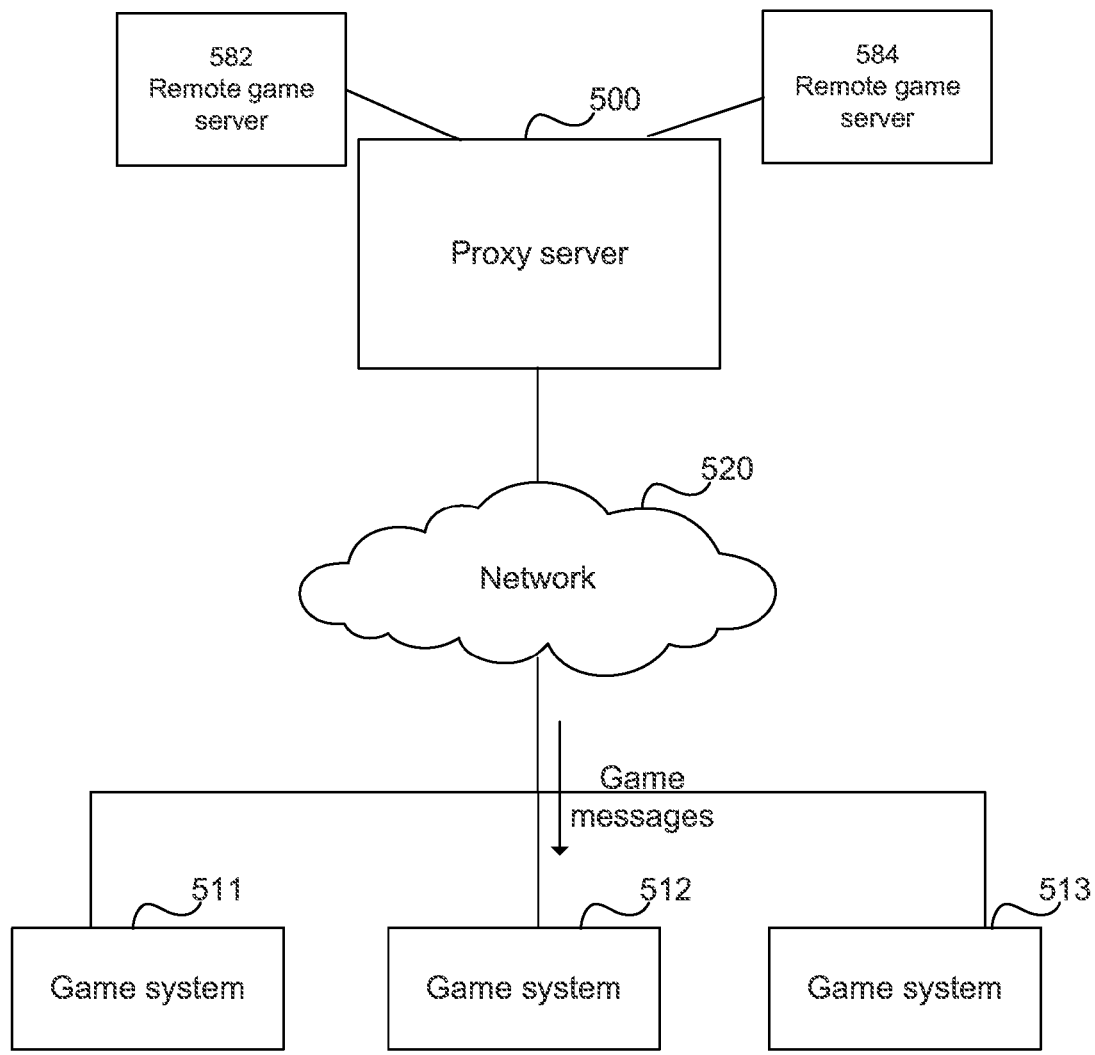
FIG. 5 illustrates an example of game systems connected to a cloud-based proxy server.

The technology disclosed herein can be applied to various computing devices including, e.g., game systems or devices capable of running game applications. For instance, FIG. 5 illustrates an example of game systems connected to a cloud-based proxy server. As depicted in FIG. 5, a proxy server 500 may provide a cloud-based game messaging service to multiple game systems 511, 512 and 513 over a network 520. The network 520 can be, e.g., the Internet. Examples of game devices 511, 512 and 513 may include, but are not limited to, a mobile phone, a smartphone, a personal digital assistant (PDA), a tablet, a mobile game console, a laptop computer, a desktop computer, or any other devices having communication capability.

In some embodiments, proxy server 500 relays all network communications of game systems to remote game servers, e.g., servers 582 and 584. The proxy server 500 serves as a proxy for all messages from and to the game systems 511, 512 and 513.

For instance, when an application running on a game system 512 requests to establish a network connection with remote game server 582, the operating system of the game system 512 forwards the request to the proxy server 500, instead of the remote game server 582. The proxy server then establishes a network connection with the remote game server 582. The remote game server 582 may send some game messages or game data for the game system 512 to the proxy server 500. The proxy server 500 in turn relays the game messages or data to the game system 512 in batches.

In some embodiments, proxy server 500 may determine the time interval for sending the messages in batches to the game systems. The determination can be made based on, e.g., the work load of the game systems, the battery levels of the game systems or the game event about to happen in the game systems. For instance, the proxy server 500 may identify that in game system 512, a predetermined game event of entering a new stage is about to happen. Examples of the predetermined game event may include, but are not limited to, starting a game by a player of the game, entering a new stage in the game by the player, entering a new place in the game by the player, completing a mission in the game by the player, obtaining a game item by the player, meeting another character in the game by the player, talking with another character in the game by the player, occurrence of a scene change in the game, any other pre-defined game-related events or milestones, or even suspension of the game at a point intended to avoid disrupting the high quality experience for the user. The proxy server 500 can send the messages from the remote game server 582 in a batch to the proxy system 512 when it determines that the game event is going to happen soon.

Although FIG. 5 illustrates all devices as game systems, a person having ordinary skill in the art can readily understand that other types of devices can be included. For example, game systems 511, 512 and 513 can be replaced with, e.g., tablets, smart phones or laptop computers.

Figure 6:
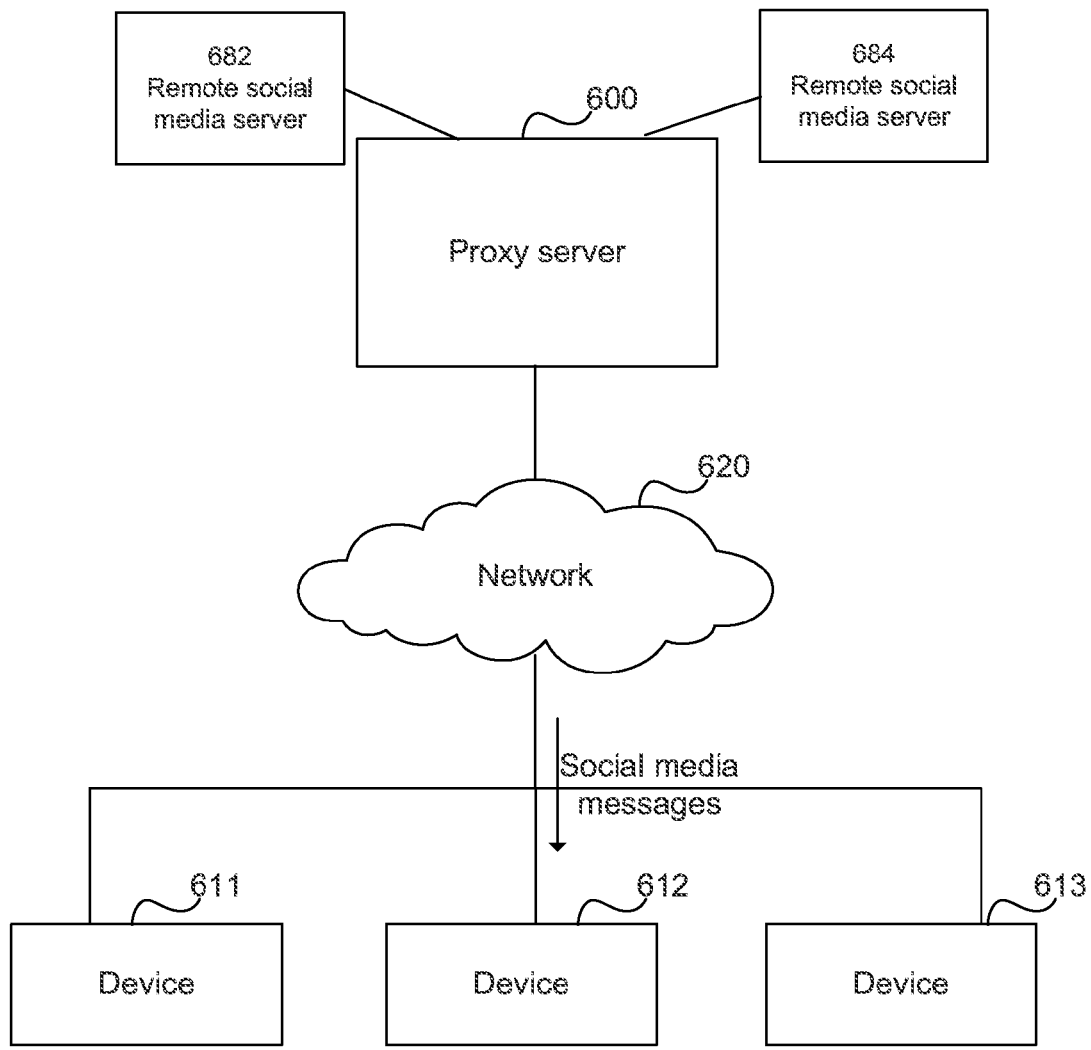
FIG. 6 illustrates an example of social media devices connected to a proxy server.

Similarly, the technology disclosed herein can also be applied to devices for social network messaging. For instance, FIG. 6 illustrates an example of social media devices connected to a proxy server. As depicted in FIG. 6, a proxy server 600 may provide a proxy service to multiple computing devices 611, 612 and 613 over a network 620. Examples of devices 611, 612 and 613 may include, but are not limited to, a mobile phone, a smartphone, a personal digital assistant (PDA), a tablet, a mobile game console, a laptop computer, a desktop computer, or any other devices having communication capability.

In some embodiments, proxy server 600 relays all social media communications of devices to remote servers, e.g., servers 682 and 684. The proxy server 600 serves as a proxy for all social media messages from and to the devices 611, 612 and 613.

For instance, when a social media application running on a device 612 requests to establish a network connection with remote social media server 682, the operating system of the system 612 forwards the request to the proxy server 600, instead of the remote game server 682. The proxy server then establishes a network connection with the remote social media server 682. The remote social media server 682 may send some social messages for the device 612 to the proxy server 600. The proxy server 600 in turn relays the social messages to the device 612 in batches.

In some embodiments, proxy server 600 may determine the time interval for sending the messages in batches to the devices 611-613. The determination can be made based on, e.g., the work load of the devices, the battery levels of the game systems.

Figure 7:
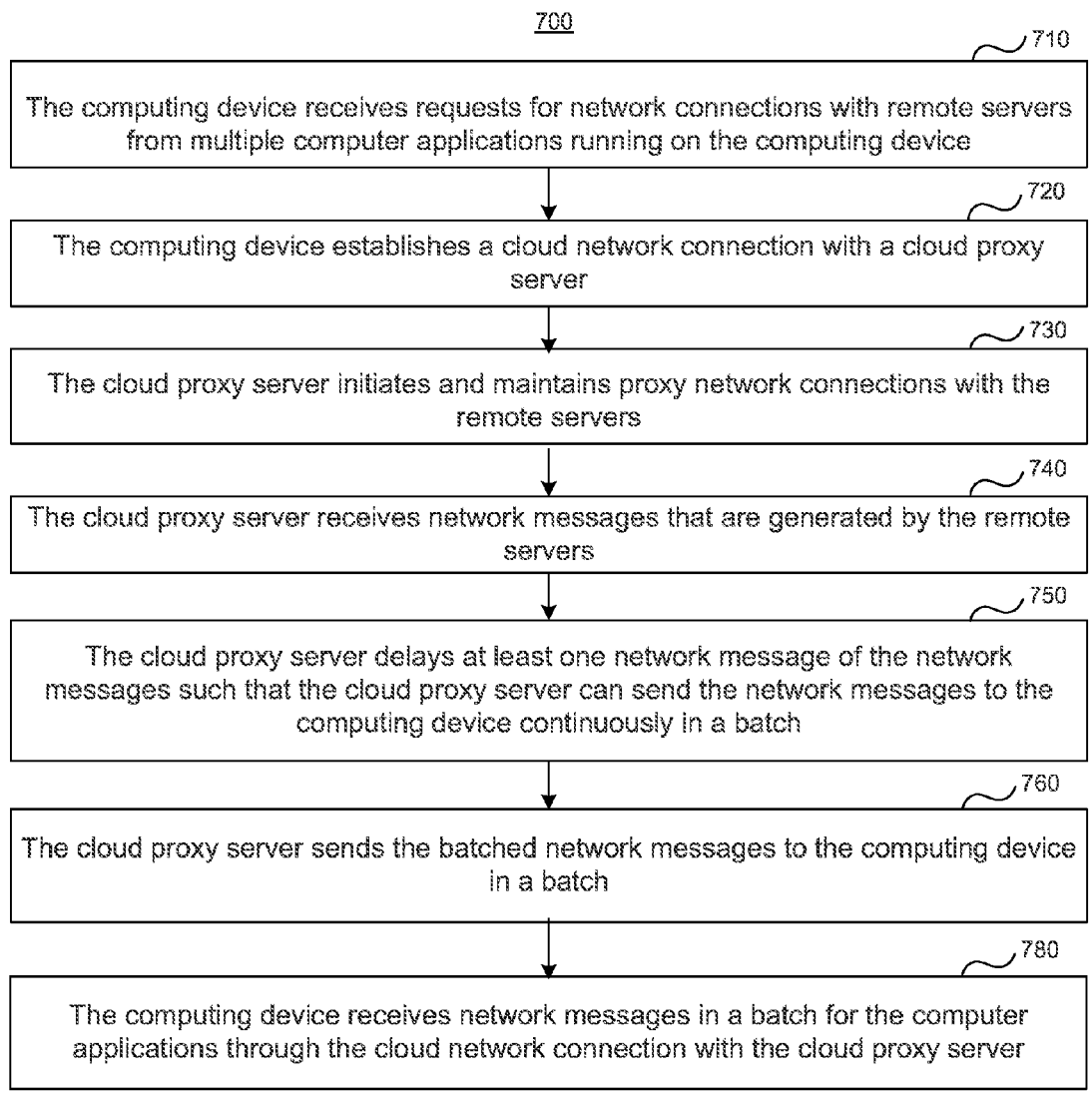
FIG. 7 illustrates an example of a process for optimizing network connections using cloud proxy connections.

FIG. 7 illustrates an example of a process 700 for optimizing network connections using cloud proxy connections. The process 700 starts at step 710, where a computing device receives requests for network connections with remote servers from multiple computer applications running on the computing device. The requests for networking connections can, e.g., include requests for establishing network socket connections between the computing device and the remote servers.

At step 720, the computing device establishes a cloud network connection with a cloud proxy server. The cloud network connection is used to receive messages for the multiple computer applications from the remote servers relayed by the cloud proxy server. The cloud proxy server is separate from the remote servers. The cloud proxy server can serve as a proxy between the computer applications running on the computing device and remote servers. At step 730, the cloud proxy server initiates and maintains proxy network connections with the remote servers. In various embodiments, the cloud network connection can be, e.g., a Transmission Control Protocol (TCP) socket connection between the computing device and the cloud proxy server. The proxy network connections can be, e.g., Transmission Control Protocol (TCP) socket connections between the cloud proxy server and the remote servers.

At step 740, the cloud proxy server receives network messages that are generated by the remote servers. These network messages are for the computer applications at the computing device.

At step 750, the cloud proxy server delays at least one network message of the network messages such that the cloud proxy server can send the network messages to the computing device in a batch. At step 760, the cloud proxy server sends the batched network messages to the computing device in a batch. The cloud proxy server batches the network messages to reduce power consumption of the computing device.

At step 770, the computing device receives network messages in a batch for the computer applications through the cloud network connection with the cloud proxy server. By receiving the network messages in a batch, the computing device can stay at a high power consumption state for a time period shorter than an overall time period for which the computing device would stay at the high power consumption if the network messages were sent individually without batching. Since the operating system of the computing device is responsible for communicating with the cloud proxy server and relays the messages to the computer applications, the computer applications receive the network messages from the cloud proxy server as if the network messages are received directly from the remote servers.

Those skilled in the art will appreciate that the logic illustrated in FIG. 7 and described above, and in each of the flow diagrams discussed below if any, may be altered in a variety of ways. For example, the order of the logic may be rearranged, substeps may be performed in parallel, illustrated logic may be omitted, other logic may be included, etc.

Figure 8:
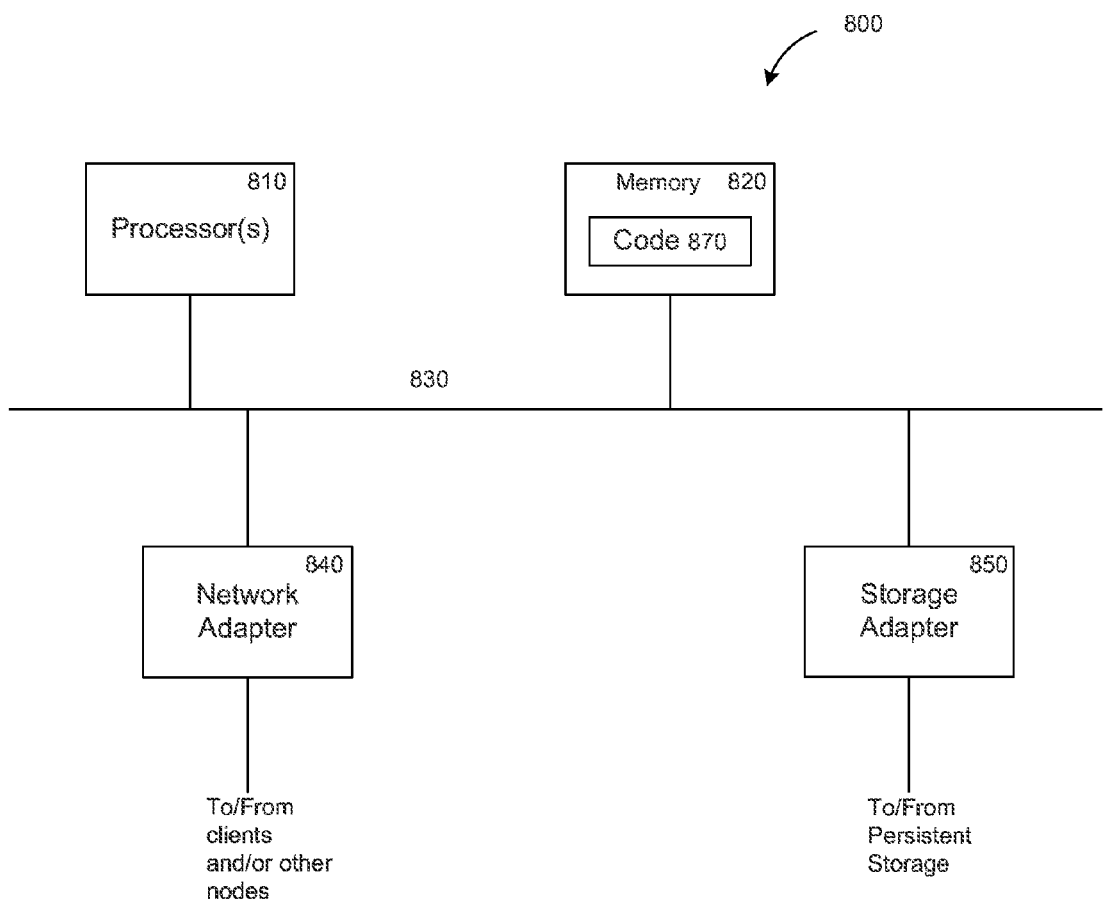
FIG. 8 is a high-level block diagram showing an example of the architecture of a computer, which may represent any computing device or server described herein.

FIG. 8 is a high-level block diagram showing an example of the architecture of a computer 800, which may represent any computing device or server described herein. The computer 800 includes one or more processors 810 and memory 820 coupled to an interconnect 830. The interconnect 830 shown in FIG. 8 is an abstraction that represents any one or more separate physical buses, point to point connections, or both connected by appropriate bridges, adapters, or controllers. The interconnect 830, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 810 is/are the central processing unit (CPU) of the computer 800 and, thus, control the overall operation of the computer 800. In certain embodiments, the processor(s) 810 accomplish this by executing software or firmware stored in memory 820. The processor(s) 810 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 820 is or includes the main memory of the computer 800. The memory 820 represents any form of random access memory (RAM), read-only memory (ROM), flash memory, or the like, or a combination of such devices. In use, the memory 820 may contain a code 870 containing instructions according to the technology disclosed herein.

Also connected to the processor(s) 810 through the interconnect 830 are a network adapter 840 and a storage adapter 850. The network adapter 840 provides the computer 800 with the ability to communicate with remote devices, over a network and may be, for example, an Ethernet adapter or Fibre Channel adapter. The network adapter 840 may also provide the computer 800 with the ability to communicate with other computers. The storage adapter 850 allows the computer 800 to access a persistent storage, and may be, for example, a Fibre Channel adapter or SCSI adapter.

The code 870 stored in memory 820 may be implemented as software and/or firmware to program the processor(s) 810 to carry out actions described above. In certain embodiments, such software or firmware may be initially provided to the computer 800 by downloading it from a remote system through the computer 800 (e.g., via network adapter 840).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A method for executing multiple gaming applications on a computing device, the method comprising:

receiving, at the computing device, requests for network connections with remote servers from the multiple gaming applications running on the computing device, the network connections being requested for accessing gaming content available through the remote servers, wherein the gaming content is utilized by at least one of the multiple gaming applications to enable a user of the computing device to play a game on the computing device;

establishing, by the computing device, a network connection with a proxy server separate from the remote servers, wherein the proxy server is configured to maintain proxy network connections with the remote servers; and receiving, at the computing device, network messages in a batch for the multiple gaming applications through the network connection with the proxy server, wherein the network messages are generated by the remote servers, wherein a given network message includes a given gaming content that is being utilized by a given gaming application to enable the user of the computing device to play a given game on the computing device, wherein the proxy server aggregates network messages received in a time period into a single batch, a time length of the time period being determined based on one or more game events of each game being played using a corresponding gaming application from the multiple gaming applications, a given game event representing a point of play within the given game which requires the given gaming content included within the given network message, wherein the determined time interval is set to reduce any delay in the execution of the given gaming application that requires the given network message, wherein the given game event includes a starting of the given game by the user, a entering of a new stage in the given game by the user, a entering of a new place in the given game by the user, a completing of a mission in the given game by the user, an obtaining of a game item in the given game by the user, a meeting of another character in the given game by the user, a talking with another character in the given game by the user, an occurrence of a scene change in the given game, any predefined game-related events, any predefined game-related milestones, or a suspension of the given game at a point of play intended to avoid disrupting an experience for the user, wherein the proxy server batches the network messages such that the computing device stays at a high power consumption state for a second time period shorter than an overall time period for which the computing device would stay at the high power consumption if the network messages were sent individually without batching, wherein the network messages are aggregated in the batch by delaying at least one network message of the network messages such that the computing device remains at the high power consumption state to receive the network messages for as little time as possible.

2. The method of claim 1, wherein the proxy server delays at least one network message of the network messages in the batch such that the proxy server sends the network messages to the computing device in the batch.

3. The method of claim 1, wherein the requests for networking connections include requests for establishing network socket connections between the computing device and the remote servers.

4. The method of claim 1, wherein the network connection with the proxy server is configured to receive messages for the multiple computer applications from the remote servers.

5. The method of claim 1, wherein the proxy server serves as a proxy between the computer applications running on the computing device and remote servers.

6. The method of claim 1, wherein the network connection with the proxy server is a Transmission Control Protocol (TCP) socket connection between the computing device and the proxy server, and the proxy network connections are Transmission Control Protocol (TCP) socket connections between the proxy server and the remote servers.

7. The method of claim 1, wherein the computer applications receive the network messages from the proxy server as if the network messages are received directly from the remote servers.

8. The method of claim 1, wherein the proxy server is a cloud-based proxy server.

9. A computing device comprising:

a networking component capable of switching between states including a high power consumption state and a low power conservation state;

a battery configured to provide power to the networking component;

a processor configured to run computer applications and an operating system of the computing device; and a memory component storing instructions of the operating system which, when executed by the processor, cause the operating system to perform a process including:

receiving, from multiple gaming applications running on the computing device, requests for network connections with remote servers, the network connections being requested for accessing gaming content available through the remote servers, wherein the gaming content is utilized by at least one of the multiple gaming applications to enable a user of the computing device to play a game on the computing device;

establishing a network connection with a proxy server separate from the remote servers, wherein the proxy server is configured to maintain proxy network connections with the remote servers; and receiving network messages in a batch for the multiple gaming applications through the network connection with the proxy server, wherein the network messages are generated by the remote servers, wherein a given network message includes a given gaming content that is being utilized by a given gaming application to enable the user of the computing device to play a given game on the computing device, wherein the proxy server aggregates network messages received in a time period into a single batch, a time length of the time period being determined based on one or more game events of each game being played using a corresponding gaming application from the multiple gaming applications, a given game event representing a point of play within the given game which requires the given gaming content included within the given network message, wherein the determined time interval is set to reduce any delay in the execution of the given gaming application that requires the given network message, wherein the given game event includes a starting of the given game by the user, a entering of a new stage in the given game by the user, a entering of a new place in the given game by the user, a completing of a mission in the given game by the user, an obtaining of a game item in the given game by the user, a meeting of another character in the given game by the user, a talking with another character in the given game by the user, an occurrence of a scene change in the given game, any predefined game-related events, any predefined game-related milestones, or a suspension of the given game at a point of play intended to avoid disrupting an experience for the user, wherein the proxy server batches the network messages such that the computing device stays at a high power consumption state for a second time period shorter than an overall time period for which the computing device would stay at the high power consumption if the network messages were sent individually without batching, wherein the network messages are aggregated in the batch by delaying at least one network message of the network messages such that the network component of the computing device remains at the high power consumption state to receive the network messages for as little time as possible.

10. The computing device of claim 9, wherein the process further includes:

switching the network component to the high power consumption state when the computing device receives the network messages from the proxy server.

11. The computing device of claim 9, wherein the network messages are aggregated in the batch such that the computing device consumes as little power as possible to receive the network messages.

12. The computing device of claim 9, wherein the operating system of the computing device includes a socket redirection module configured to redirect the requests from the computer applications for network connections with the remote server to the proxy server.

13. The computing device of claim 12, wherein the socket redirection module is responsible for network communications with the proxy server, and the computer applications running on the computing device are not aware of the existence of the proxy server.

14. The computing device of claim 9, wherein the computer applications are performing and receiving network messages as if the computing device were maintaining network connections directly with the remote servers.

15. The computing device of claim 9, wherein the network messages include push notifications generated by the remote servers.

16. The computing device of claim 9, wherein the operating system of the computing device includes a message modification module configured to modify the network messages received from the proxy server before the network messages are fed to the computer applications, to network messages as if they were directly sent from the remote servers.

17. The computing device of claim 16, wherein the message modification module changes source socket addresses of the network messages from a socket address of the proxy server to socket addresses of the remote servers.

18. A non-transitory computer readable storage medium storing computer executable instructions for executing multiple gaming applications on a computing device, comprising:

instructions for receiving requests for network connections with remote servers from the multiple gaming applications executing on the computing device, the network connections being requested for accessing gaming content available through the remote servers, wherein the gaming content is utilized by at least one of the multiple gaming applications to enable a user of the computing device to play a game on the computing device;

instructions for establishing a network connection with a proxy server separate from the remote servers, wherein the proxy server is configured to maintain proxy network connections with the remote servers; and instructions for receiving network messages in a batch for the multiple gaming applications through the network connection with the proxy server, wherein the network messages are generated by the remote servers, wherein a given network message includes a given gaming content that is being utilized by a given gaming application to enable the user of the computing device to play a given game on the computing device, wherein the proxy server aggregates network messages received in a time period into a single batch, a time length of the time period being determined based on one or more game events of each game being played using a corresponding gaming application from the multiple gaming applications, a given game event representing a point of play within the given game which requires the given gaming content included within the given network message, wherein the determined time interval is set to reduce any delay in the execution of the given gaming application that requires the given network message, wherein the given game event includes a starting of the given game by the user, a entering of a new stage in the given game by the user, a entering of a new place in the given game by the user, a completing of a mission in the given game by the user, an obtaining of a game item in the given game by the user, a meeting of another character in the given game by the user, a talking with another character in the given game by the user, an occurrence of a scene change in the given game, any predefined game-related events, any predefined game-related milestones, or a suspension of the given game at a point of play intended to avoid disrupting an experience for the user, wherein the proxy server batches the network messages such that the computing device stays at a high power consumption state for a second time period shorter than an overall time period for which the computing device would stay at the high power consumption if the network messages were sent individually without batching, wherein the network messages are aggregated in the batch by delaying at least one network message of the network messages such that the computing device remains at the high power consumption state to receive the network messages for as little time as possible.

19. The non-transitory computer readable storage medium of claim 18, wherein the proxy server delays at least one network message of the network messages in the batch such that the proxy server sends the network messages to the computing device in the batch.

20. The non-transitory computer readable storage medium of claim 18, wherein the requests for networking connections include requests for establishing network socket connections between the computing device and the remote servers.

21. The non-transitory computer readable storage medium of claim 18, wherein the network connection with the proxy server is configured to receive messages for the multiple computer applications from the remote servers.

22. The non-transitory computer readable storage medium of claim 18, wherein the proxy server serves as a proxy between the computer applications running on the computing device and remote servers.

23. The non-transitory computer readable storage medium of claim 18, wherein the network connection with the proxy server is a Transmission Control Protocol (TCP) socket connection between the computing device and the proxy server, and the proxy network connections are Transmission Control Protocol (TCP) socket connections between the proxy server and the remote servers.

24. The non-transitory computer readable storage medium of claim 18, wherein the computer applications receive the network messages from the proxy server as if the network messages are received directly from the remote servers.

25. The non-transitory computer readable storage medium of claim 18, wherein the proxy server is a cloud-based proxy server.

\* \* \* \* \*